United States Patent [19]
Gonidec et al.

[11] Patent Number: 6,068,213
[45] Date of Patent: May 30, 2000

[54] AIRCRAFT ENGINE DUCTED FAN COWLING WITH THRUST REVERSER SECTION AND FAIRINGS FOR FAN SHROUD BRACE MEMBERS IN FAN EXHAUST DUCT

[75] Inventors: Patrick Gonidec, Montivilliers; Pascal Gérard Rouyer, Saint Aubin Routot; Guy Bernard Vauchel, Le Havre, all of France

[73] Assignee: Societe Hispano Suiza Aerostructures, France

[21] Appl. No.: 09/096,293

[22] Filed: Jun. 12, 1998

[30] Foreign Application Priority Data

Jun. 12, 1997 [FR] France .................................. 97 07277

[51] Int. Cl.$^7$ .................................................. B64D 27/00
[52] U.S. Cl. .......................... 244/54; 244/53 B; 60/226.1; 60/226.2
[58] Field of Search .................................... 244/54, 53 B, 244/62; 60/226.1, 226.2

[56] References Cited

U.S. PATENT DOCUMENTS

| 4,145,877 | 3/1979 | Montgomery | 60/229 |
|---|---|---|---|
| 4,238,092 | 12/1980 | Brennan | 244/54 |
| 4,712,750 | 12/1987 | Ridgwell | 244/117 A |
| 4,940,196 | 7/1990 | Lardellier | 244/54 |
| 5,136,839 | 8/1992 | Armstrong | 60/226.1 |
| 5,205,513 | 4/1993 | Schilling | 244/54 |
| 5,524,847 | 6/1996 | Brodell et al. | 244/54 |
| 5,706,648 | 1/1998 | Porte et al. | 244/54 |

FOREIGN PATENT DOCUMENTS

| 0 315 486 | 5/1989 | European Pat. Off. . |
|---|---|---|
| 0 761 947 | 3/1997 | European Pat. Off. . |
| 0 769 617 | 4/1997 | European Pat. Off. . |
| 1.259.348 | 3/1961 | France . |
| 1.482.538 | 4/1967 | France . |
| 2.030.034 | 10/1970 | France . |
| 1 209 723 | 10/1970 | United Kingdom . |

*Primary Examiner*—J. Woodrow Eldred
*Attorney, Agent, or Firm*—Bacon & Thomas PLLC

[57] ABSTRACT

A ducted fan aircraft turbojet engine having an inner engine core cowling, an outer fan shroud, an outer fan outlet cowling including a thrust reverser, a fan exhaust duct between the inner engine core cowling and the outer fan outlet cowling, at least one fan shroud brace connecting the engine and the outer fan shroud, and at least one fairing element extending into and along the fan exhaust duct and located directly adjacent and rearwardly of the at least one fan shroud brace. The at least one fairing may be connected directly to the at least one fan shroud brace, the inner engine core cowling or the outer fan outlet cowling. The invention has utility where the fan outlet cowling and thrust reverser are mounted independently of the inner engine core cowling over their respective inner areas.

15 Claims, 5 Drawing Sheets

AIRCRAFT ENGINE DUCTED FAN COWLING WITH THRUST REVERSER SECTION AND FAIRINGS FOR FAN SHROUD BRACE MEMBERS IN FAN EXHAUST DUCT

BACKGROUND OF THE INVENTION

This invention relates to aircraft engine ducted fan cowlings with rear thrust reverser sections mounted independently of the inner engine core cowling. Specifically, the invention is a fairing arrangement for fan shroud braces in such an environment.

In aircraft ducted fan (bypass) engines, a fan exhaust duct channels cold, bypass fan exhaust flow rearwardly, the duct being defined by an outer wall of an inner engine core cowling and an inner wall forming a continuation of the outer wall of the shroud enclosing the fan. The fan exhaust duct at its rearward section may also contain the hot engine exhaust flow in some configurations or may only contain the fan exhaust air.

The outer fan exhaust cowling is faired to reduce power plant drag, particularly where the engine is mounted under an aircraft wing or is attached to the rear section of the fuselage of an aircraft.

The rearward located thrust reverser section of the fan exhaust cowling includes thrust reverser elements of any known type, for example, doors, flaps or cascade elements. Illustrative examples of such thrust reversers can be seen in French Patent Nos. 1 482 538 and 2 030 034. In such examples, thrust reverser elements include pivoted doors forming part of the external cowling defining the fan exhaust duct when closed, a fixed upstream or forward structure, a rearward structure and longitudinal beam elements connecting the forward and rearward structures and extending between the doors. The doors are circumferentially spaced around the fan exhaust duct and pivoted between their forward and rearward ends for rotation about pivots connected to the beams on either side of the doors. The doors themselves are constructed with end, side, inner and outer walls that may constitute part of the fan exhaust duct outer wall.

An exemplary cascade type thrust reverser is seen in U.S. Pat. No. 4,145,877 where the thrust reverser includes flaps driven by a linearly movable rear shroud, the flaps effectively blocking the fan exhaust duct and directing the fan exhaust flow through cascade vanes which are exposed when the rear shroud is opened. In this example, a specific design feature is the flap driving linkage unconnected with the primary engine inner cowling.

As illustrated in FIG. 1 of the appended drawings, an outer ducted fan cowling with a split thrust reverser section 10 that can be opened in two sections 12 is combined with a primary inner engine cowling 11 covering the engine core. This type of arrangement defines a so-called C-duct 15 that carries fan bypass exhaust air rearwardly (downstream).

This arrangement enables easy engine access after a locking system holding the two halves 12 together at their bottom sides are released and each half is pivoted upwardly about a longitudinal pivot axis located near an engine pylon, the pivot axis extending above and parallel with the engine axis.

This type of cowling requires a physical link at the rear side of the cowling halves 12 called an island that connects the primary inner engine cowling 11 and outer fan exhaust cowling 12. A part of the island 13 extends into the fan exhaust stream, which is also true of the part 14 defining the C-duct at the upper section of the reverser section.

FIG. 3 shows the reverser section of FIGS. 1 and 2 in the environment of a known ducted fan type turbojet engine layout that includes fan shroud braces 3 located towards the rear of the fan shroud or enclosure 4 and that connect the shroud 4 to inner engine structural elements. The braces are located just forwardly of the rearward fan exhaust cowling and thrust reverser section 10 adjacent the upstream inlet to the duct 15.

In known fan exhaust cowling and thrust reverser systems integrated with the fan shroud or enclosure, the braces 3 can include aerodynamically shaped and contoured fairing parts located rearwardly of the braces and extending along the fan exhaust flow path in the fan exhaust duct because the supporting structure for such fairing arrangements is available in the fan exhaust cowling and reverser structure. Such aerodynamic parts, for example, can be mounted on the inner or outer walls 11 and 12. The island 13 and enclosing part 14 likewise can be formed to fair the rear sides of braces 3.

However, when the primary engine core cowling 11 is largely or entirely independent of the fan exhaust outer cowling and reverser structure 12, as shown in FIG. 4, support for the aerodynamic fairings for struts 3 at their downstream ends is not possible using the outer fan cowling and reverser structure.

BRIEF SUMMARY OF THE INVENTION

This invention has as its objective improving the aerodynamic flow along the support braces 3 when a fan outlet cowling and thrust reverser section is not physically connected to the inner engine core cowling other than at the engine support pylon connecting the engine to the aircraft, that is, where the fan exhaust cowling is mounted independently of the engine inner core cowling.

More specifically, the invention provides an aerodynamic fairing arrangement for fan shroud support braces extending between the fan shroud of a ducted fan type aircraft turbojet engine and inner engine structure, the fairing arrangement including individual fairings associated with each brace and extending into and along the fan exhaust duct that extends rearwardly of the fan shroud.

The fairings may be connected directly to the housing braces, to the inner engine core cowling or to the outer fan outlet cowling.

The fairing elements may include apertures defining flow paths between the fan exhaust duct and the interior of the inner engine core cowling.

BRIEF DESCRIPTION OF THE DRAWINGS

With reference to the appended drawings.

DETAILED DESCRIPTION OF PREFERRED EMBODIMENTS OF THE INVENTION

Figure 1:
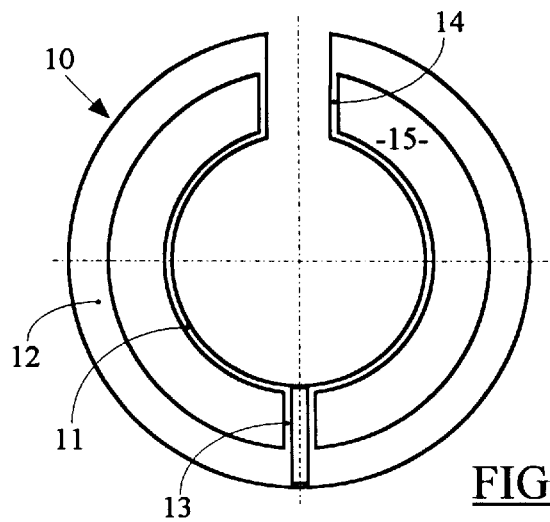
FIG. 1 is a front view of a known fan outlet cowling and thrust reverser configuration comprising two halves and which has been described above.
Figure 2:
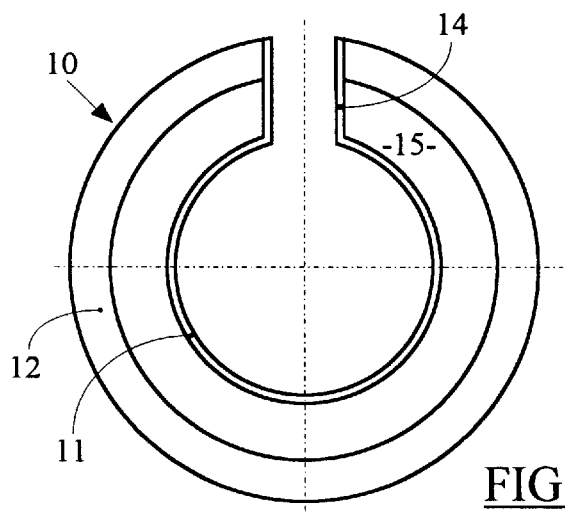
FIG. 2 is a front view of a known fan outlet cowling and thrust reverser configuration in which the outer structure of the cowling and reverser is independent of the inner engine core cowling.
Figure 3:
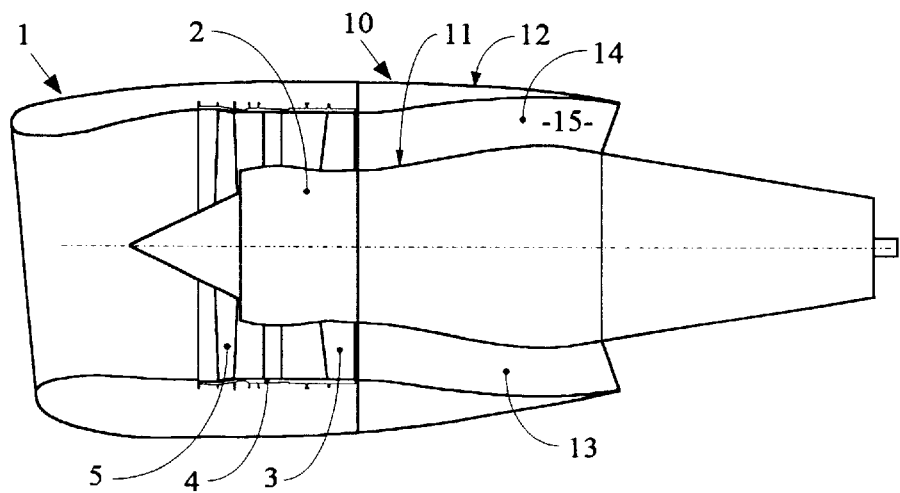
FIG. 3 is a longitudinal section view taken through a plane extending through the axis of rotation of a turbojet engine including a ducted fan, a housing for the ducted fan, fan shroud braces and an outer cowling thrust reverser section.
Figure 4:
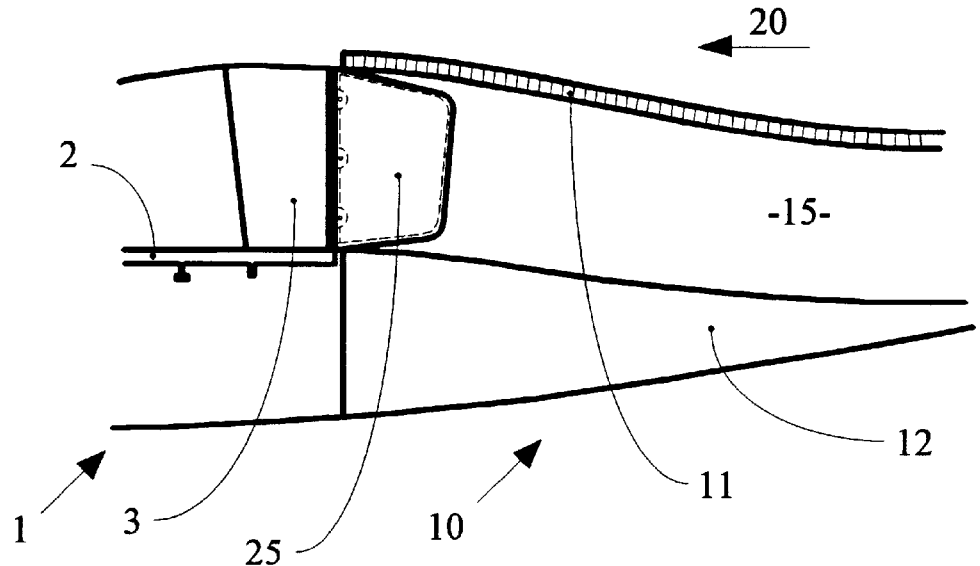
FIGS. 4–9 show various embodiments of the invention including fairing arrangements for fan shroud braces used with independently mounted fan outlet cowling thrust reverser sections.

With reference to FIG. 4, an embodiment of the invention is illustrated in the environment of a fan exhaust cowling and thrust reverser structure 12 that is supported largely independently of the inner engine core cowling 11 in the manner described above. The fan exhaust or bypass duct 15 extends between the outer wall of the engine core cowling 11 and the inner surface of the outer fan exhaust cowling assembly 12 of the thrust reverser section of the fan shroud 1. Fan shroud braces 3, as already described, extend between engine structure 2 and fan shroud 1. The rear fan exhaust and reverser section 12 may be connected to the shroud 1 in the direction indicated by arrow 20.

In accordance with the invention, aerodynamic fairing 25 is connected directly to the rear of one or more braces 3. The shape, dimensions and configuration of each fairing is determined in accordance with known aerodynamic principles.

The fairings 25 may be integral, monolithic, hollow, honeycombed, acoustic or otherwise. The material employed may be metallic, composite, thermoplastic or any other material that is appropriate and meets structural requirements for the fairing elements.

The connection between each brace 3 and fairing 25 is consistent with engine manufacturing technology, including commonly used screw assemblies.

Figure 5:
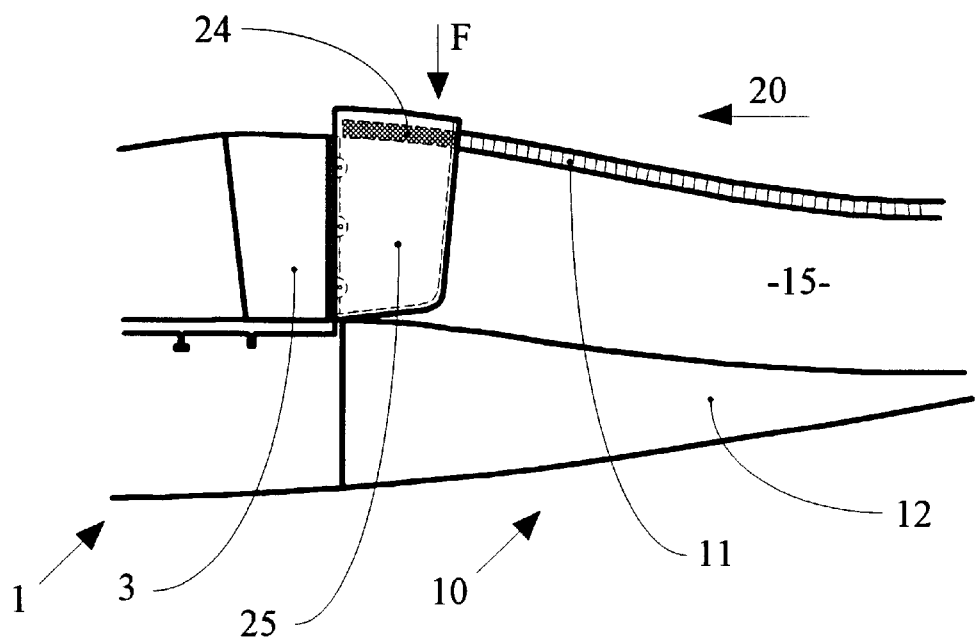

FIG. 5 shows an embodiment of the invention including an interface between the fairing 25 and the inner primary engine core wall structure 11. The aerodynamic contour of the fairing 25 allows the fairing to be oriented in the direction of arrow 20. A seal 24 may be provided either directly on the wall of the inner cowl 11 or on parts mounted on either of the elements 11 and 25. Such a seal may be constructed in accordance with known sealing principles.

Figure 10:
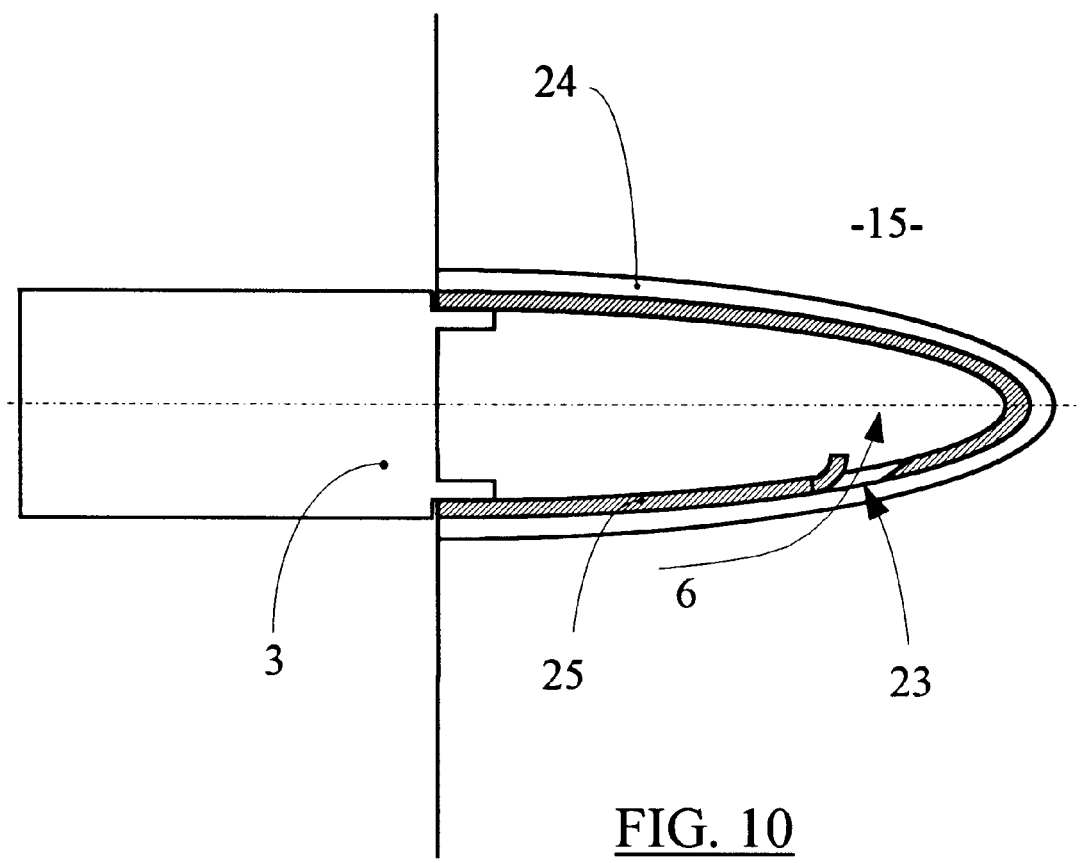
FIG. 10 is a plan view taken in a direction of arrow F in FIG. 5.

This embodiment offers a remarkable advantage in that, as shown in FIG. 10, within the recompression zone of the fan exhaust flow 6 passing through the duct 15 adjacent the fairing 25 fan exhaust air may be bled by a flow path defining aperture 23 into the interior of the fairing 25 to provide a ventilation function for the engine 2. The shape, position and design configuration of the aperture 23 may be matched to provide a specific flow guiding path in the fairing side wall. Any number and orientation of apertures 23 may be provided in fairing 25.

Figure 6:
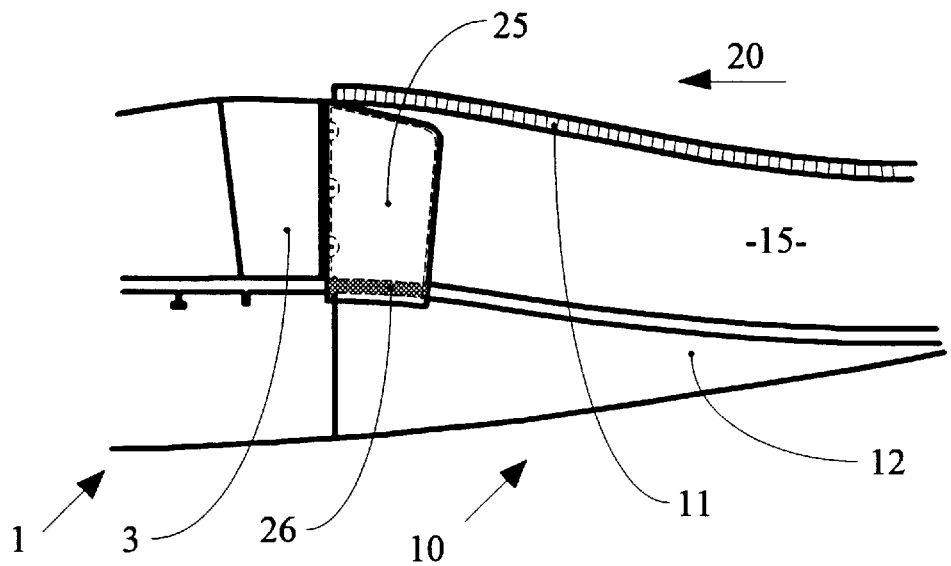

FIG. 6 illustrates the same principle as shown in FIG. 5 in connection with the outer cowling structure 12, wherein a seal 26 between fairing 25 is provided between the fairing and the outer wall 12.

Figure 7:
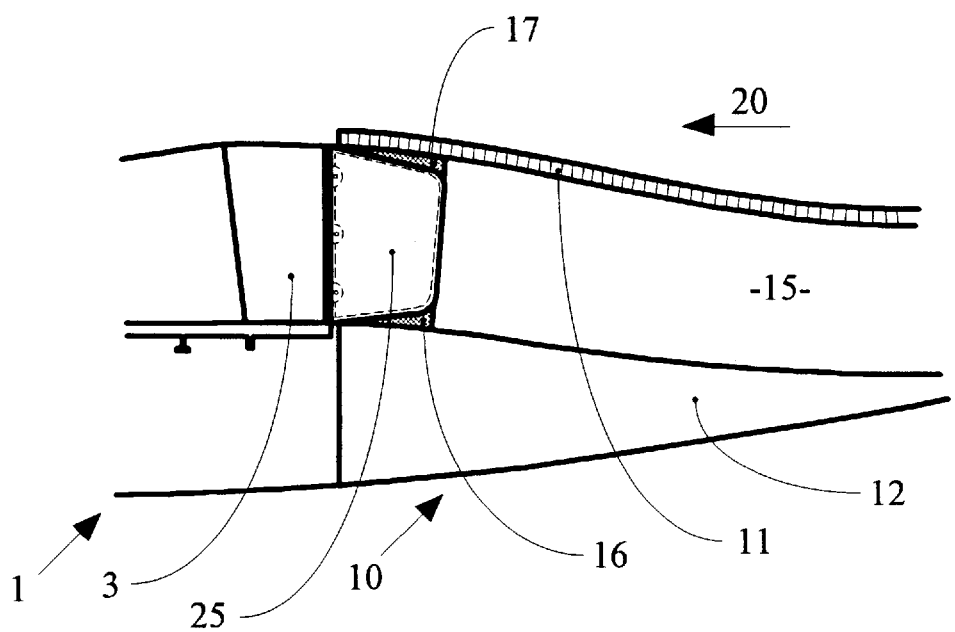

In accordance with the embodiment shown in FIG. 7, a clearance filling and blocking arrangement 16 and 17 is provided between one or both ends of fairing 25 and the adjacent surfaces of the inner cowling 11 and the outer cowling structure 12. These fillers may assume a shape conforming with the ends of the fairing 25 when they contact the fairing 25 or may be provided with a clearance relative to the fairing 25. Appropriate materials may be utilized, including rigid and flexible materials, depending on the particular application envisioned.

Figure 8:
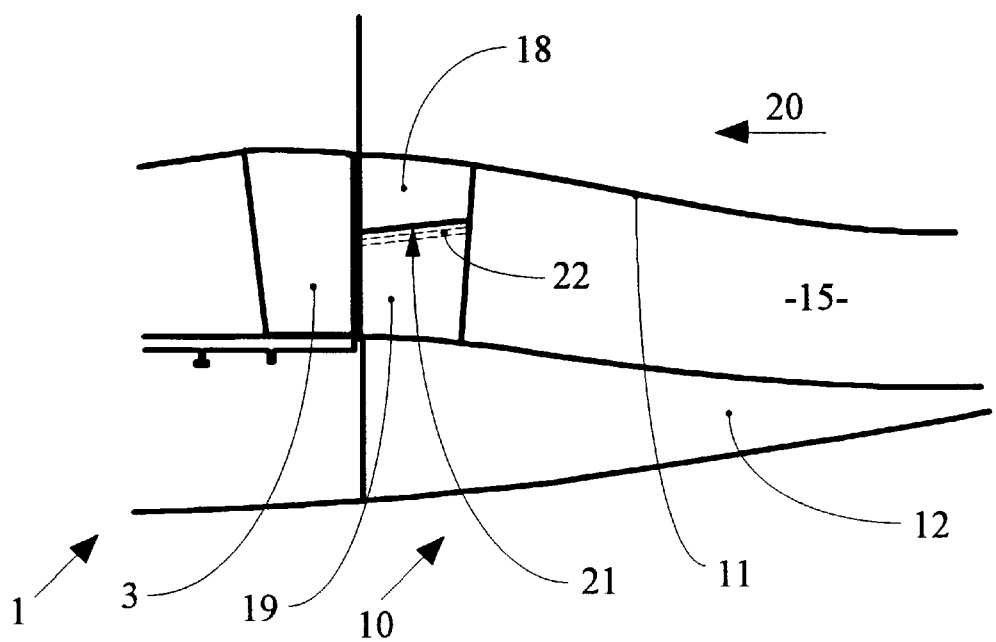

FIG. 8 shows another embodiment of the invention wherein a two-part fairing 18, 19 is provided, the parts intersecting at a joint 22. The part 18 is associated with the inner engine core cowling 11 and the outer part 19 is connected to the outer cowling section 12. In this embodiment, the fairing is not connected directly to the brace 3. The interface 21 between the fairing parts 18, 19 may be located at any level between the inner and outer parts 18 and 19 between the inner cowling 11 and the outer cowling 12. In the example of FIG. 8, the inner structure 11 is installed on the engine 2 before the outer structure 12 is installed. The centering device 22 may be used between the two fairing halves 18 and 19.

Figure 9:
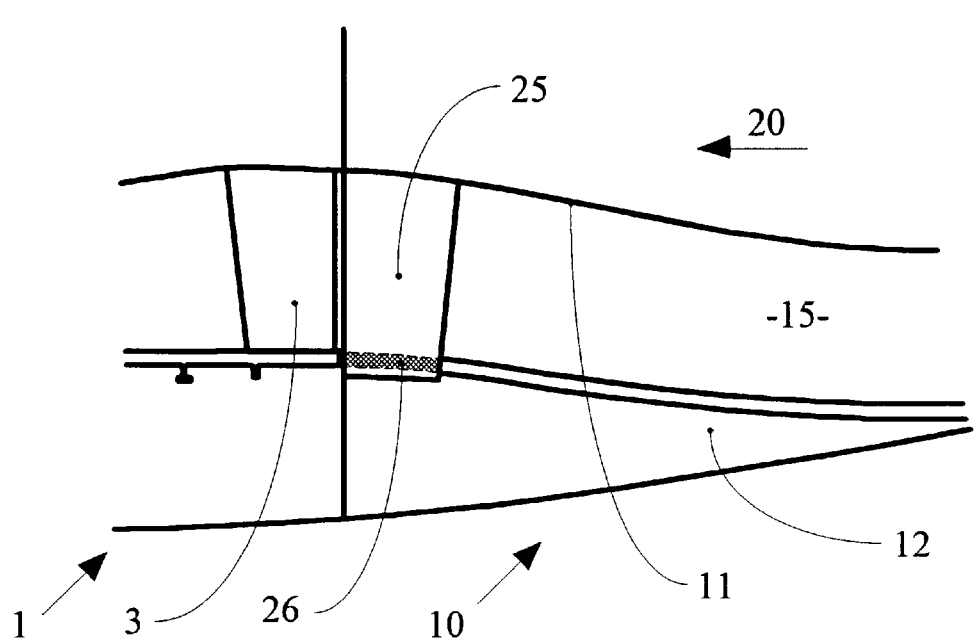

Another embodiment of the invention is shown in FIG. 9, illustrating a variation of the embodiment shown in FIG. 8. In accordance with this design, the fairing 25 is fully integrated with the inner engine core cowling 11 and extends to the outer cowling wall 12. A seal 26 may be provided if the fairing 25 actually extends into the outer wall 12. Alternatively, a clearance may be provided between the end of the fairing 25 and the outer cowling wall 12.

The design parameters described above may be used on any brace 3.

The various embodiments of the invention described above may constitute integral parts of the braces 3. The design configuration of the fan exhaust cowling and thrust reverse section 10 need not be changed with the fairing elements described.

Various modifications to the structure of the preferred embodiments to achieve the same functions can be made by a person skilled in the art without departing from the scope of the invention defined by the following claims.

What is claimed is:

1. In a ducted fan aircraft turbojet engine having an inner engine core cowling, an outer fan shroud, an outer fan outlet cowling including a thrust reverser rearward of the shroud, a fan exhaust duct between the inner engine core cowling and the outer fan outlet cowling, and at least one fan shroud brace connecting the engine and the outer fan shroud, wherein the outer fan outlet cowling and thrust reverser are mounted independently of the inner engine core cowling over at least their respective inner areas, the improvement comprising:

an aerodynamic fairing element extending into and along the fan exhaust duct and located directly adjacent and rearwardly of the at least one fan shroud brace.

2. The improvement according to claim 1, wherein the fairing element is directly connected to the fan shroud brace.

3. The improvement according to claim 1, wherein the fairing is connected to the inner engine core cowling.

4. The improvement according to claim 1, wherein the fairing is connected to the outer fan outlet cowling.

5. The improvement according to claim 1, wherein the fairing comprises two portions, one portion being secured to the inner engine core cowling and the other portion being secured to the outer fan outlet cowling.

6. The improvement according to claim 5, further comprising:

a centering structure at an interface between the two portions of the fairing.

7. The improvement according to claim 1, wherein the inner engine core cowling includes an outer wall defining a portion of the fan exhaust duct, the fairing extends through the outer wall and a seal is provided between the outer wall and the fairing.

8. The improvement according to claim 1, wherein the outer fan outlet cowling includes an inner wall defining the fan exhaust duct, the fairing extends through the inner wall and a seal is provided between the inner wall and the fairing.

9. The improvement according to claim 7, wherein the fairing includes at least one aperture defining a flow path between the fan outlet duct and an interior of the inner engine core cowling.

10. The improvement according to claim 1, further comprising:
   at least one end clearance between the fairing and an adjacent wall of the fan exhaust duct; and
   a filler blocking the at least one end clearance.

11. The improvement according to claim 1, further comprising:
   end clearances at opposed ends of the fairing between the opposed ends and the inner engine core cowling and the outer fan outlet cowling, respectively; and
   fillers blocking the end clearances.

12. The improvement according to claim 3, wherein the fairing is not connected to the outer fan outlet cowling.

13. The improvement according to claim 4, wherein the fairing is not connected to the inner engine core cowling.

14. The improvement according to claim 3, further comprising:
   a seal mounted in an interface zone between the fairing and the outer fan outlet cowling.

15. The improvement according to claim 4, further comprising:
   a seal mounted in an interface zone between the fairing and the inner engine core cowling.

* * * * *